March 13, 1934. W. J. D. VAN DIJCK 1,950,830
APPARATUS FOR CARRYING OUT DISTILLATIONS UNDER LOW PRESSURE
Filed Jan. 24, 1931
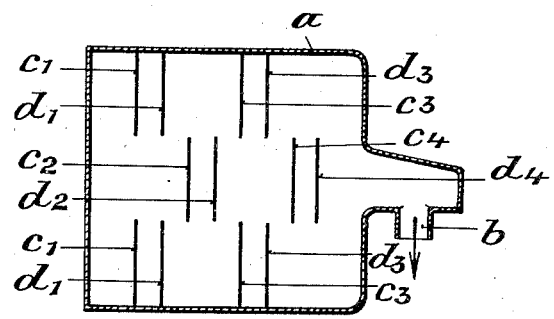
INVENTOR:
Willem Johannes Dominicus van Dijck
BY C. F. Wenderoth
ATTORNEY.

Patented Mar. 13, 1934

1,950,830

UNITED STATES PATENT OFFICE

1,950,830

APPARATUS FOR CARRYING OUT DISTILLATIONS UNDER LOW PRESSURE

Willem Johannes Dominicus van Dijck, The Hague, Netherlands, assignor to Naamlooze Vennootschap De Bataafsche Petroleum Maatschappij, The Hague, Netherlands Application January 24, 1931, Serial No. 511,045
In The Netherlands February 27, 1930

4 Claims. (Cl. 202—205)

The invention relates to a process and apparatus for carrying out distillations under low pressure.

With such distilling methods so far known the choice of a low pressure is limited, because a reduction in pressure always necessitates an increase in the size of the apparatus, including the connecting lines, in consequence of the larger volumes of vapours and gases, and also makes it necessary to increase the velocity of the gases and vapours in reverse proportion to the pressure.

With the distilling methods so far known the rate of distillation is generally governed by the differences in pressure which exist in consequence of the difference between the temperatures of distillate and condensate, as also by the temperature level at which the distillation takes place.

The invention now relates to a process for distilling under low pressure whereby the velocity with which the transport from the vaporizing to the condensing surface takes place is substantially equal to the molecular velocity.

When, further, provision is made to avoid the vaporization being retarded by the diffusion in the distillate, for instance by providing for sufficient turbulence of the distillate or by working with thin moving distillate layers, then the rate of distillation is likewise substantially equal to the molecular velocity.

In distillation there are as a rule molecules which under the conditions of the distillation are either condensable or non-condensable, and for sake of simplicity these will be referred to as vapor and gas molecules respectively. Now for proper distillation it is essential that the velocity of the gas molecules corresponds to that of the vapour molecules, and according to this invention this is achieved by the transportation of the gas molecules in the distilling system being effected substantially by the vapour molecules themselves, which, as already stated, pass through the system at the molecular velocity.

Processes are already known in which the distillation under low pressure takes place at the molecular or practically molecular velocity. For instance in the British Patent Specification No. 303,078 a distilling process is described in which the material to be distilled is vaporized in a closed, highly evacuated chamber and the vapour condensed on a condensing surface fitted up in the chamber in such a position in relation to the vaporizing surface as to make the distance which a molecule of the vapour has to travel between the two surfaces equal in extent to the mean free path of the molecules of the vapour in that chamber under the conditions prevailing there in, whereby the vapour is transported at the molecular velocity, whilst the stream of vapour molecules is conducted by means of a screen or suchlike device in the direction of the vacuum pump, so that the action of this pump is supported by the driving influence of the vapour molecules on the gas molecules.

With the process according to the present invention, the material to be distilled is likewise vaporized in a closed, evacuated chamber but in contradistinction to the prior art the vapour is condensed on condensing surfaces, fitted up in the chamber in such a position in respect to the vaporizing surfaces, that the average distance which the vapour molecules have to travel between those surfaces in the direction in which the vacuum pump works is always greater than the distance in the opposite direction, the absolute distances between the various surfaces being of the order of the mean free path of the molecules under the conditions prevailing.

As will be explained in detail below, in this manner a stream of vapour molecules is generated which acts upon the gas molecules over a longer distance in the direction of the vacuum pump than in the opposite direction, so that while maintaining the full molecular velocity in the transport without employing screening devices, which always cause a certain resistance, the transport of the gas likewise takes place at substantially the molecular velocity.

It has further been found that as a rule the rate of distillation can only be brought up to this high speed level either by applying very thin layers of the material to be distilled or by causing sufficient turbulence in the liquid or both. This, of course, applies only to mixtures, seeing that with pure substances the diffusion factor naturally plays no part.

The invention will now be further explained with reference to a particular embodiment of an apparatus in which the process according to the invention can be carried out and which constitutes part of the invention.

In this embodiment the vaporizing and condensing surfaces which have the shape of flat plates, are vertically positioned. It is emphasized, however, that an apparatus according to the invention need not by any means necessarily have a vertical construction, whilst neither are the various surfaces restricted to any particular shape.

The only essential conditions for an apparatus according to the invention are that it consists of an evacuable chamber in which the vaporizing and condensing surfaces are arranged in such a manner that the average distance which the vapour molecules have to travel between those surfaces in the direction of the action of the vacuum pump is always greater than the distance in the opposite direction, these distances being of the absolute order of the mean free path of the molecules under the conditions prevailing, and further that the respective surfaces should preferably be shaped or positioned in such a way that the material to be distilled can be suitably introduced and transported, preferably in thin layers, the condensate can be suitably transported and carried off, and the gas can pass without obstruction.

The drawing shows a schematic sectional elevation of a form of an apparatus for the application of the process according to the invention, in which $a$ represents the chamber evacuated by a vacuum pump connected to the outlet $b$, which chamber contains the cold plates $c$ and the warmer plates $d$. When the material to be vaporized is passed over plate $d_1$ molecules of vapour and gas are generated from the liquid on both sides of the plate. The vapour molecules on the side where plate $c_1$ is situated are there condensed and as the distance between the plates $d_1$ and $c_1$ is of the order of the mean free path, the transport takes place at the molecular velocity, whilst owing to the material to be distilled being passed over the plate $d_1$ as a moving film, the diffusion has no retarding effect, so that also the distillation takes place at the molecular velocity.

Through the influence of the large excess of vapour molecules, the gas molecules formed on both sides of the plate $d_1$ are driven to the cold plates $c_1$ and $c_3$, and as they are only able to escape sideways, in so far as the space between $c_1$ and $d_1$ is concerned, they pass into the stream travelling to $c_2$ in the same way as those molecules travelling between $d_1$ and $c_3$, which can likewise only escape sideways, pass into the stream to $c_4$. Thus the whole mass of gas contained in the chamber is transported in the direction of the pump. In other words all the gas molecules generated on plate $d_1$ are driven by the vapour molecules in counter-current to the action of the vacuum pump only over the distance $d_1$ to $c_1$, whilst over the several times longer distance $d_1$ to $c_3$ they are driven in the direction of the pump action. Consequently there results on the whole a propulsion of the gas molecules in the same direction as the action of the pump, which in fact is the principle underlying the construction of the apparatus and forming the basis of the invention, namely the arrangement of the vaporizing and condensing surfaces in such a way that the average distance which the vapour molecules have to travel between those surfaces in the direction in which the vacuum pump acts is greater than that in the opposite direction.

It is obvious that both the process according to the invention and the apparatus for its application may be varied in numerous ways without departing from the principle of the invention. With the explanation given here any one skilled in the art may easily arrive at various other embodiments of the invention, all of which, however, come within the scope of the invention in so far as the principle of the invention is applied. Particularly these are the means for feeding and carrying off the material to be distilled; the varying of the temperature of one or more surfaces or sets of surfaces, by which different fractions can obviously be obtained; the shape of the surfaces, which may be made flat or bent in any way or may be tubular, the conducting of heating or cooling agents through the apparatus, etc.

What I claim is:

1. An apparatus for carrying out distillations under low pressure, comprising a chamber provided with a vacuum pump connection, a plurality of heated surfaces therein, part of which surfaces are turned towards the vacuum pump connection and part turned away therefrom, a plurality of cooled surfaces arranged opposite the heated surfaces in such a manner that the average distance from a heated surface to the next cooled surface is longer in the direction towards the vacuum pump connection than in the opposite direction, means for distributing the material to be evaporated over the heated surfaces and means for collecting the condensate from the cooled surfaces.

2. An apparatus for carrying out distillations under low pressure, comprising a chamber provided with a vacuum pump connection, a series of heated plates therein, a series of cooled plates therein arranged asymmetrically in relation to said heated surfaces, means for distributing the material to be evaporated over both sides of the heated plates, and means for collecting the condensate from both sides of the cooled plates, the relative position of the heated and cooled plates being such that the average distance taken in the direction towards the vacuum pump connection from a heated plate to the next cooled plate is longer than the average distance taken in the direction away from the vacuum pump connection.

3. An apparatus for carrying out distillations under low pressure comprising a chamber provided with a vacuum pump connection, a plurality of sets of heated and cooled surfaces arranged therein, in such a manner that the average distance from a heated surface to the next cooled surface is longer in the direction towards the vacuum pump connection than in the opposite direction, the sets being arranged in staggered relation, means for distributing the material to be evaporated over the heated surfaces and means for collecting the condensate from the collecting surfaces.

4. An apparatus for carrying out distillations under low pressure comprising a chamber with one or more substantially vertical heated surfaces arranged therein and one or more substantially vertical cooled surfaces arranged therein opposite the heated surfaces, means for distributing the material to be evaporated in a thin layer over the said heated surfaces and means for collecting the condensate flowing in a thin layer down the said cooled surfaces.

WILLEM JOHANNES
DOMINICUS van DIJCK.